US005621449A

United States Patent [19]

Leenders et al.

[11] Patent Number: 5,621,449

[45] Date of Patent: Apr. 15, 1997

[54] INK JET RECORDING METHOD OPERATING WITH A CHEMICALLY REACTIVE INK

[75] Inventors: Luc Leenders, Herentals; Carlo Uyttendaele, Berchem; Herman Uytterhoeven, Bonheiden, all of Belgium

[73] Assignee: AGFA-Gevaert, N.V., Mortsel, Belgium

[21] Appl. No.: 141,020

[22] Filed: Oct. 26, 1993

[30] Foreign Application Priority Data

Sep. 8, 1993 [EP] European Pat. Off. .............. 93202599

[51] Int. Cl.[6] .................................................... G01D 15/16

[52] U.S. Cl. ............................ 347/101; 347/96; 347/102; 106/20 D

[58] Field of Search ............................. 347/101, 96, 105, 347/100, 102; 106/20 D

[56] References Cited

U.S. PATENT DOCUMENTS 3,031,329 4/1962 Wingert .................................. 428/411

3,906,141 9/1975 Anderson et al. ........................ 347/96

FOREIGN PATENT DOCUMENTS 5611887 9/1981 Japan ...................................... 347/96

OTHER PUBLICATIONS

Sam Bucetti, et al., "Chemical Mist Printing", IBM Technical Disclosure Bulletin, vol. 20, #12, May 1978, pp. 5423–5424.

*Primary Examiner*—Valerie A. Lund
*Attorney, Agent, or Firm*—Breiner & Breiner

[57] ABSTRACT

An ink jet recording method comprising the steps of:

(1) image-wise projecting liquid, called ink, in the form of droplets onto a receiving material containing a substance that by chemically reacting with another substance contained in said droplets is capable of forming a visually detectable product, characterized in that according to a first mode said receiving material contains at least one substantially light-insensitive organic silver salt and said ink contains a reducing agent for said silver salt, and according to a second mode said receiving material contains said reducing agent and the ink contains said silver salt, and optionally (2) heating said receiving material during and/or after the deposition of said ink on said receiving material to start or enhance reduction of said silver salt(s) forming thereby image-wise a deposit of silver metal in said receiving material.

11 Claims, No Drawings

INK JET RECORDING METHOD OPERATING WITH A CHEMICALLY REACTIVE INK

DESCRIPTION

1. Field of the Invention

The present invention relates to an ink jet recording method and recording materials suited for use in said method.

2. Background of the Invention

Thermal imaging or thermography is a recording process wherein images are generated by the use of imagewise modulated thermal energy.

In thermography two approaches are known:

1. Direct thermal formation of a visible image pattern by imagewise heating of a recording material containing matter that by chemical or physical process changes colour or optical density.
2. Thermal dye transfer printing wherein a visible image pattern is formed by transfer of a coloured species from an imagewise heated donor element onto a receptor element.

Thermal dye transfer printing is a recording method wherein a dye-donor element is used that is provided with a dye layer wherefrom dyed portions or incorporated dye is transferred onto a contacting receiver element by the application of heat in a pattern normally controlled by electronic information signals.

The optical density of transparencies produced by the thermal transfer procedure is rather low and in most of the commercial systems—in spite of the use of donor elements specially designed for printing transparencies—only reaches 1 to 1.2 (as measured by a Macbeth Quantalog Densitometer Type TD 102). However, for many application fields a considerably higher transmission density is asked for. For instance in the medical diagnostical field a maximal transmission density of at least 2.5 is desired.

A survey of "direct thermal" imaging methods is given in the book "Imaging Systems" by Kurt I. Jacobson-Ralph E. Jacobson, The Focal Press—London and New York (1976), Chapter VII under the heading "7.1 Thermography". Thermography is concerned with materials which are not photosensitive, but are sensitive to heat or thermosensitive. Imagewise applied heat is sufficient to bring about a visible change in a thermosensitive imaging material.

Most of the "direct" thermographic recording materials are of the chemical type. On heating to a certain conversion temperature, an irreversible chemical reaction takes place and a coloured image is produced.

A wide variety of chemical systems has been suggested some examples of which have been given on page 138 of the above mentioned book of Kurt I. Jacobson-Ralph E. Jacobson, describing the production of a silver metal image by means of a thermally induced oxidation-reduction reaction of a silver soap with a reducing agent.

According to U.S. Pat. No. 3,080,254 a typical heat-sensitive copy paper includes in the heat-sensitive layer a water-insoluble silver salt, e.g. silver stearate and an appropriate organic reducing agent, of which 4-methoxy-1-hydroxydihydronaphthalene is a representative. Localized heating of the sheet in the thermographic reproduction process, or for test purposes, by momentary contact with a metal test bar heated to a suitable conversion temperature in the range of about 90°–150° C., causes a visible change to occur in the heat-sensitive layer. The initially white or lightly coloured layer is darkened to a brownish appearance at the heated area. In order to obtain a more neutral colour tone a heterocyclic organic toning agent such as phthalazinone is added to the composition of the heat-sensitive layer. The heat-sensitive copying paper is used in "front-printing" or "back-printing" as illustrated in FIGS. 1 and 2 of U.S. Pat. No. 3,074,809.

As described in Handbook of Imaging Materials, edited by Arthur S. Diamond—Diamond Research Corporation—Ventura, Calif., printed by Marcel Dekker, Inc. 270 Madison Avenue, New York, N.Y. 10016 (1991), p. 498–499 in direct thermal printing signals are converted to electric pulses and then through a driver circuit selectively transferred to a thermal printhead. The thermal printhead consists of microscopic heat resistor elements, which convert the electrical energy into heat via the Joule effect. The electric pulses thus converted into thermal signals manifest themselves as heat transferred to the surface of the thermal paper wherein the chemical reaction resulting in colour development takes place.

According to the last mentioned book (ref. p. 499–551) several systems were developed for direct thermal imaging of which the leuco dye system has found commercial use. Optical density obtained with embodiments of said system is usually not higher than 2 and requires mixtures of leuco dye compounds to produce neutral black.

Heat-sensitive copying materials including a redox-system of light-insensitive organic silver salt and organic reducing agent in the presence of a toning agent may well provide relatively high maximal optical densities but suffer normally from a too high minimal optical density and rather poor stability under conditions of moderate heating (about 50° C.) and relative humidity in the range of 30 to 70%.

Poor shelf-life and image-deterioration by the production of background fog after imaging is a problem characteristic for recording materials containing a set of uniformly distributed reaction partners by means of which on image-wise heating an optical density pattern can be produced.

In direct printing the imaging material is solely deposited in the areas in which optical density has to be built up.

For a long time printing proceeded by pressure-contact of an ink-loaden marker or printing form with a receiving material, normally plain paper.

Nowadays ink-jet printing has found wide application. In ink jet printing [ref. e.g. the book "Principles of Non Impact Printing" by Jerome L. Johnson (1986) Palatino Press, 18792 Via Palatino, Irvine Calif. 92715—USA] tiny drops of ink fluid are projected directly onto a receptor surface for printing without physical contact between the printing device and the receptor. The placement of each drop on the printing substrate is controlled electronically. Printing is accomplished by moving the print head across the paper or vice versa.

Different types of ink jet printing known as "continuous jet" and "drop-on-demand" are described in the above mentioned book of Jerome L. Johnson and in the book Imaging Processes and Materials—Neblette's Eight Edition, Edited by John Sturge et al, Van Nostrand Reinhold—New York (1989), p. 379–384.

Continuous ink jet printing is characterized by pressure-projecting ink through a nozzle to generate drops of ink directed in a continuous stream towards the ink receiving recording element passing meanwhile an image-wise modulated ink-deflection system allowing ink droplets of said stream to deposit image-wise on the recording element.

Drop-on-demand or impulse ink jet differs from continuous ink jet in that the ink supply is maintained at or near atmospheric pressure. An ink drop is ejected from a nozzle only on demand when a controlled excitation coming from acoustic pressure generated by piezoelectric element or from pressure generated by local electrothermal evaporation of liquid (thermal bubble-jet) is applied to an ink-filled channel ending in a nozzle.

As described in Journal of Imaging Technology, Vol. 15, Number 3, June 1989 by C. H. Hertz and B. A. Samuelson in their article "Ink Jet Printing of High Quality Color Images", p. 141, 20–40 drops of ink have to be applied to each pixel (elementary picture element) to ensure maximum color density within a commercially acceptable writing time. By drop-on-demand ink jet only one drop of ink is deposited per pixel in the image or no ink at all, i.e. drop-on-demand ink jet methods operate as on-off processes. In practice in order to made a record within an acceptable writing time drop-on-demand ink jet printing does not work with ink drops in superposition, and as a consequence thereof no optical densities of more than 2 can be obtained therewith owing to the small mass of each colored ink droplet and the limited concentration of colorant therein.

It would be a major improvement if ink jet printing could be used for producing images with increased optical density, say of more than 2 without droplet-superposition, or the number of superposed droplets could be reduced and yet high optical densities could be obtained.

In IBM Technical Disclosure Bulletin Vol. 23 No. 4 September 1980, W. T. Pimbley describes under the title "Leuco Dye System for Ink Jet Printing" that improved archival properties for ink used in ink jet printing can be attained by using leuco or vat dyes. Such dyes convert to their permanent form when oxidized. Accordingly, the record medium is first coated or impregnated with an oxidizing agent such as acidic materials, for example, acidified clays, organic acids or polymeric phenols. Upon combining with the oxidant, the dyes convert to their permanent form, becoming insoluble and having high tinctorial strength and excellent archival properties, such as water fastness and light fastness. However, as in direct thermal recording materials based on the use of leuco dyes optical densities higher than 2 are difficult to obtain certainly with drop-on-demand ink jet recording.

OBJECTS AND SUMMARY OF THE INVENTION

It is an object of the present invention to provide a recording method operating with an ink jet in conjunction with an ink receiving material of particularly good shelf-life whereon substantially black images of high optical density, e.g. of at least 2, can be obtained with excellent archival properties and without problems of background fogging.

It is a further object of the present invention to provide an ink receiving material suited for use in combination with ink jet printing and having the above enumerated properties.

Other objects and advantages of the present invention will appear from the following description and examples.

In accordance with the present invention a recording method is provided which method comprises the steps of:

(1) image-wise projecting liquid, called ink, in the form of droplets onto a receiving material containing a substance that by chemically reacting with another substance contained in said droplets is capable of forming a visually detectable product, characterized in that according to a first mode said receiving material contains at least one substantially light-insensitive organic silver salt and said ink contains a reducing agent for said silver salt, and according to a second mode said receiving material contains said reducing agent and the ink contains said silver salt, and optionally (2) heating said receiving material during and/or after the deposition of said ink on said receiving material to start or enhance reduction of said silver salt(s) forming thereby image-wise a deposit of silver metal in said receiving material.

DETAILED DESCRIPTION OF THE INVENTION

A more detailed description will now be given of the ingredients of the imaging receiving material and of the "inks" applied in conjunction therewith.

Substantially light-insensitive organic silver salts particularly suited for use according to the present invention are silver salts of aliphatic carboxylic acids known as fatty acids, wherein the aliphatic carbon chain has preferably at least 12 C-atoms, e.g. silver laurate, silver palmitate, silver stearate, silver hydroxystearate, silver oleate and silver behenate, and likewise silver dodecyl sulphonate described in U.S. Pat. No. 4,504,575 and silver di-(2-ethylhexyl)-sulfosuccinate described in published European patent application 227 141. Useful modified aliphatic carboxylic acids with thioether group are described e.g. in GB-P 1,111,492 and other organic silver salts are described in GB-P 1,439,478, e.g. silver benzoate and silver phthalazinone, which may be used likewise to produce a thermally developable silver image. Further are mentioned silver imidazolates and the substantially light-insensitive inorganic or organic silver salt complexes described in U.S. Pat. No. 4,260,677.

When the ink inherently has already an optical density by containing e.g. a black colorant or mixture of colorants, the optical density of the deposited colorant(s) is added to the optical density of the silver obtained by reduction so that optical densities of more than 3 can be produced easily. For example, the the optical density provided by the deposited colorant(s) is already in the range of 0.8 to 1.5.

However, the ink may be colorless since by silver salt reduction alone using sufficiently strong reducing agents optical densities higher than 3 can be obtained, particularly when a thermal treatment follows the ink deposition. The application of heat will favour a rapid increase of optical density. So, by the use of sufficiently strong reducing agents the heating step can be omitted.

When carrying out the present invention according to its first mode the concentration of the reducing agent(s) in the ink is preferably at least 0.5 g/l, and is e.g. in the range of 1 g/l to 10 g/l; the coverage of the silver salt in the receiving material is preferably in the range of 1 $g/m^2$ to 10 $g/m^2$.

According to a special embodiment ink of different reagent-concentration, and optionally of different optical density by containing different amounts of colorants is applied image-wise from different nozzles. The ink expulsion of the different nozzles is actuated in such a way that ink drops stemming from one nozzle produce ink spots with different optical density with regard to another nozzle, hereby the gradation of the images is controlled.

In order to avoid clogging of the ink jet nozzles the ink contains its imaging ingredients preferably in dissolved form.

In ink-jet printing according to the present invention "water-based", "solvent-based" "mixed water/solvent-based" and "hot melt" or "phase change inks" can be used with the proviso that they contain at least one reducing agent for the substantially light-unsensitive silver salt(s) in the ink receiving material.

A discussion of the formulation of colored water-based ink-jet inks and preferred properties thereof is given by Henry R. Kang in Journal of Imaging Science, Vol. 35, No. 3, May/June 1991, p. 179–201 and the already mentioned "Handbook of Imaging Materials", edited by Arthur S. Diamond, p. 537–540.

Solvent-based ink-jet inks, containing a major amount of organic solvent(s), but optionally containing some amount of water, are described e.g. in JP 55160070, JP 63152678, JP 63152679, JP 63152680, JP 61036382 and 61036381. Further are mentioned the low viscosity solvent-based inks described in EP 386349 and the inks described in U.S. Pat. Nos. 4,386,961, 4,400,215, 4,957,553 and 4,822,418. Solvent-based inks with electrostatic deflection properties are described e.g. in JP 61181879. Presently, solvent-based inks contain methyl ethyl ketone, ethanol and methanol as primary solvent (ref. the already mentioned "Handbook of Imaging Materials", edited by Arthur S. Diamond, p. 540).

Solvent-based inks containing a major amount of organic solvent(s) and that are particularly suited for use in thermal ink-jet printers (a type of drop-on-demand ink jet printers) are described in detail in published European patent application 0 413 442. The solvents used have boiling points from about 50° C. to about 200° C. and are e.g. members of the following group : alkyl glycol ethers, wherein the alkyl group has up to 4 carbon atoms, aromatic hydrocarbons, alkyl pyrrolidinones, ketones and lactones. Said ink is particularly suited for printing on a wide variety of plastic films and yields water-fast and smear resistant images.

Hot melt inks for ink jet printing are described e.g. in U.S. Pat. Nos. 4,659,383, 4,820,346, 4,931,095 and EP 20286, and their properties are discussed in the already mentioned "Handbook of Imaging Materials", edited by Arthur S. Diamond, p. 530.

As described in the book Imaging Information Storage Technology Edited by Wolfgang Gerhartz—VCH Weinheim—New York—Basel—Cambridge (1992) under the heading "1.13. Ink-jet printing" many of the commercially available ink-jet printers operate with water-based ink (see p. 43 of said book) by which is meant that such inks contain more than 70% by weight of water. Small amounts of humectants such as glycols are added to reduce the evaporation rate and for continuous ink-jet printing the ink contains some salt in order to obtain a required electrical conductivity and chargeability for electrostatic droplet deflection. Because of the poor solubility of salt in most organic solvent-based inks the inks for continuous ink jet printing are mostly water-based inks or contain a major amount of water. When operating with a silver-forming redox system the reducing agent of that system may be used in salt form and play the role of electrical conductivity increasing ingredient.

Suitable organic reducing agents for the reduction of substantially light-unsensitive organic silver salts are organic compounds containing at least one active hydrogen atom linked to O, N or C, such as is the case in aromatic di- and tri-hydroxy compounds, e.g. hydroquinone and substituted hydroquinones, catechol, pyrogallol, gallic acid and gallates; aminophenols, METOL (tradename), p-phenylenediamines, alkoxynaphthols, e.g. 4-methoxy-1-naphthol described in U.S. Pat. No. 3,094,417, acetoacetonitriles, pyrazolidin-3-one type reducing agents, e.g. PHENIDONE (tradename), pyrazolin-5-ones, indanedione-1,3 derivatives, hydroxytetrone acids, hydroxytetronimides, reductones, and ascorbic acid. Representatives for thermally activated reduction of organic silver salts are described e.g. in U.S. Pat. Nos. 3,074,809, 3,080,254, 3,094,417, 3,887,378 and 4,082,901.

Particularly suited organic reducing agents for use in thermally activated reduction of said silver salts are organic compounds containing in their structure two free hydroxy groups (—OH) in ortho-position on a benzene nucleus as is the case in catechol, which is preferred for use in water-based inks, and polyhydroxy spiro-bis-indane compounds corresponding to the following general formula (I) which are preferred for use in solvent-based inks:

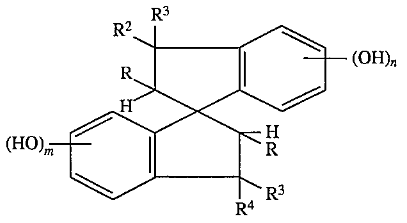

(I)

wherein:

R represents hydrogen or alkyl, e.g. methyl or ethyl, each of $R^1$ and $R^2$ (same or different) represents, an alkyl group, preferably methyl group or a cycloalkyl group, e.g. cyclohexyl group, each of $R^3$ and $R^4$ (same or different) represents, an alkyl group, preferably methyl group or a cycloalkyl group, e.g. cyclohexyl group, and n is a positive integer 2 or 3, m represents zero or is a positive integer 1, 2 or 3, and at least two of the hydroxyl groups of said formula are in ortho-position.

Particularly useful for solvent-based and hot-melt inks are the polyhydroxy-spiro-bis-indane compounds described in U.S. Pat. No. 3,440,049 as photographic tanning agent, more especially 3,3,3',3'-tetramethyl-5,6,5',6'-tetrahydroxy-1,1'-spiro-bis-indane (called indane I) and 3,3,3',3'-tetramethyl-4,6,7,4',6',7'-hexahydroxy-1,1',-spiro-bis-indane (called indane II). Indane is also known under the name hydrindene.

The preparation of indane (I) can proceed by condensation of catechol with acetone such as disclosed by Baker, J. Chem. Soc., 1943, pp. 1678–81.

The preparation of indane (II) can proceed by the condensation of polyhydric phenols with acetone as disclosed by Fischer, Furling and Grant, J. Am. Chem. Soc., 58, pp. 820–22 (1936). Alkyl and hydroxy substituted spiro-bis-indanes where the hydroxyls are in ortho-position of the aromatic rings can also be prepared as described in German patent 1,092,648. Other preparation methods are described in German patent 1,084,260, JP 03148232 A2, JP 02286642 A2, JP 02286641 A2, and Tetrahedron Lett., (34), 3707–10 in the article titled: "New Spirobiindanetetrols from 3-tert.-Alkylpyrocatechols". For the use of polyhydroxy-spiro-bis-indane compounds in direct thermal printing reference is made to unpublished European patent application Nr. 92 20 3495, filed 16th November 1992.

The liquid used in ink jet printing according to the present invention may contain a mixture of reducing agents, e.g. of (a) primary, relatively strong reducing agent, and less active auxiliary reducing agent that form together a synergistic (superadditive) reducing mixture.

In the first recording mode of the present invention the image receiving material may contain said auxiliary reducing agent having poor reducing power in the binder layer containing the organic silver salt without causing fog in the absence of primary reducing agent. For that purpose preferably sterically hindered phenols and sulfonamidophenols are used.

Sterically hindered phenols as described e.g. in U.S. Pat. No. 4,001,026 are examples of such auxiliary reducing agents that can be used in admixture with said organic silver salts without premature reduction reaction and fog-formation at room temperature.

For obtaining a neutral black image tone with silver formed in the higher optical density parts and neutral grey in the lower densities the reducible silver salt(s) and reducing agents are advantageously used in conjunction with a so-called toning agent known from thermography or photothermography.

Preferably said toning agent is contained in the ink-image receiving material.

Suitable toning agents are the phthalimides and phthalazinones within the scope of the general formulae described in U.S. Pat. No. 4,082,901. Further reference is made to the toning agents described in U.S. Pat. Nos. 3,074,809, 3,446,648 and 3,844,797. Particularly useful toning agents are likewise the heterocyclic toner compounds of the benzoxazine dione or naphthoxazine dione type within the scope of following general formula:

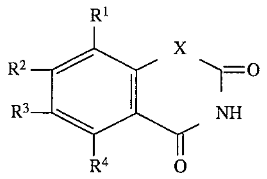

in which:

X represents O or $NR^5$;

each of $R^1$, $R^2$, $R^3$ and $R^4$ (same or different) represents hydrogen, alkyl, e.g. C1–C20 alkyl, preferably $C_1$–$C_4$ alkyl, cycloalkyl, e.g. cyclopentyl or cyclohexyl, alkoxy, preferably methoxy or ethoxy, alkylthio with preferably up to 2 carbon atoms, hydroxy, dialkylamino of which the alkyl groups have preferably up to 2 carbon atoms or halogen, preferably chlorine or bromine; or $R^1$ and $R^2$ or $R^2$ and $R^3$ represent the ring members required to complete a fused aromatic ring, preferably a benzene ring, or $R^3$ and $R^4$ represent the ring members required to complete a fused aromatic aromatic or cyclohexane ring. A very useful toner such as 3,4-dihydro-2,4-dioxo-1,3,2H-benzoxazine within the scope of said general formula is in U.S. Pat. No. 3,951,660.

According to a special embodiment the ink has a color which makes that the silver image formed in the reduction has a neutral black color. For example, by the presence in the ink of a blue dye the yellowish hue of a silver image formed by reduction (ref. U.S. Pat. No. 3,080,254) is compensated and a neutral black image is obtained. Operating that way it is possible to dispense with so-called toning agents in the image receiving material or to reduce their concentration. According to another embodiment by autocoupling reaction of oxidized reducing agent a blue color is formed, which is the case by using 4-methoxy-1-naphthol as reducing agent or oxidized reductor, e.g. p-phenylene diamine type reductor, is coupled with a color coupler known from silver halide color photography or photothermography. The color coupler may be contained in the ink receiving material and/or in the ink.

In order to shorten dry time, surface-active agents (surfactants) or penetrants may be present in the ink. These additives and other ones may be present likewise in the image receiving material preferably in the imaging layer, e.g. free fatty acids and UV-absorbing compounds such as optical brightening agents. Surface-active agents, and substances called penetrants improve the take up of the ink in the ink receiving material. Further are mentioned antistatic agents, e.g. non-ionic antistatic agents including a fluorocarbon group as e.g. in $F_3C(CF_2)_6CONH(CH_2CH_2O)$—H, plasticizers, friction reducing compounds e.g. in the form of particles protruding from the recording layer, e.g. talc particles and polymer beads with low friction coefficient, and transparent inorganic pigments, e.g. colloidal silica.

The ink-image receiving material contains the substantially light-unsensitive silver salt or reducing agent(s) preferably in a film-forming binder that is not impermeable either for the "ink" or for the reducing agent in dissolved, molten state or vaporized state.

As binding agent for the imaging layer preferably thermoplastic waterinsoluble resins are used wherein the ingredients can be dispersed homogeneously or form therewith a solid-state solution. For that purpose all kinds of natural, modified natural or synthetic resins may be used, e.g. cellulose derivatives such as ethylcellulose, cellulose esters, carboxymethylcellulose, starch ethers, polymers derived from ,α, β-ethylenically unsaturated compounds such as polyvinyl chloride, after-chlorinated polyvinyl chloride, copolymers of vinyl chloride and vinylidene chloride, copolymers of vinyl chloride and vinyl acetate, polyvinyl acetate and partially hydrolyzed polyvinyl acetate, polyvinyl alcohol, polyvinyl acetals, e.g. polyvinyl butyral, copolymers of acrylonitrile and acrylamide, polyacrylic acid esters, polymethacrylic acid esters and polyethylene or mixtures thereof. A particularly suitable ecologically interesting (halogen-free) binder is polyvinyl butyral. Polyvinyl butyral containing some vinyl alcohol units is marketed under the trade name BUTVAR B79 of Monsanto USA.

The binder to organic silver salt weight ratio is preferably in the range of 0.2 to 6, and the thickness of the image forming layer is preferably in the range of 5 to 16 μm.

The above mentioned polymers or mixtures thereof forming the binder may be used in conjunction with waxes or "heat solvents" also called "thermal solvents" or "thermosolvents" improving the penetration of the reducing agent(s) and thereby the reaction speed of the redox-reaction at elevated temperature.

By the term "heat solvent" in this invention is meant a non-hydrolyzable organic material which is in solid state at temperatures below 50° C. but becomes on heating above that temperature a plasticizer for the binder of the layer wherein they are incorporated and possibly act then also as a solvent for at least one of the redox-reactants, e.g. the reducing agent for the organic silver salt. Useful for that purpose are a polyethylene glycol having a mean molecular weight in the range of 1,500 to 20,000 described in U.S. Pat. No. 3,347,675. Further are mentioned compounds such as urea, methyl sulfonamide and ethylene carbonate being heat solvents described in U.S. Pat. No. 3,667,959, and compounds such as tetrahydro-thiophene-1,1-dioxide, methyl anisate and 1,10-decanediol being described as heat solvents in Research Disclosure, December 1976, (item 15027) pages 26–28. Still other examples of heat solvents have been described in U.S. Pat. No. 3,438,776, and 4,740,446, and in published EP-A 0 119 615 and 0 122 512 and DE-A 3 339 810.

Heat-solvents may be used likewise in the ink-jet liquid, especially when they are water-soluble and can act as moistening agent for the organic water-insoluble binder layer wherein the organic silver salt is coated and improve the penetration of the reducing agent in said layer bringing about a much faster reactive contact with the reducible organic silver salt.

The layer containing the organic silver salt is commonly coated from an organic solvent containing the binder in dissolved form but may be applied from aqueous medium from a solution of a hydrophilic water-soluble polymer, e.g. gelatin, or from a latex containing a dispersed polymer having hydrophilic functionality. Polymers with hydrophilic functionality for forming an aqueous polymer dispersion (latex) are described e.g. in U.S. Pat. No. 5,006,451, but serve therein for forming a barrier layer preventing unwanted diffusion of vanadium pentoxide present as anti-static agent.

In the embodiment according to the present invention wherein the reductor is applied solely image-wise by ink-jet no reaction can take place in the image-background area (being free from reductor) no stabilization step is required and archival storability of the obtained images is obtained.

According to a particular embodiment associated with the use of a "water-based ink" a water-insoluble fairly hydrophobic binder layer, such as a polyvinylbutyral layer, containing a said substantially light-unsensitive organic silver salt is over-coated with a hydrophilic colloid layer capable of rapidly absorbing a water-based ink-jet ink containing a reducing agent for the silver salt. Hydrophilic colloid layers suited for said purpose preferably contain organic polymeric hydrophilic colloids known as binding agent in silver halide emulsion layer materials, e.g. gelatin and such polymers that can be applied from an aqueous solution binders and may be hardened up to a certain degree without destroying their permeability with respect to water and aqueous liquids. A survey of such binders is given in Research Disclosure November 1989, item 307105 in the chapter IX. "Vehicles and vehicle extenders" and for suitable hardening agents reference is made to chapter X. "Hardeners".

Preferably, after receiving the aqueous liquid droplets containing a dissolved reducing agent the receiving material having an outermost hydrophilic layer is heated, e.g. in the range of 60° to 120° C. to promote the diffusion of the reducing agent from the hydrophilic colloid layer into the waterinsoluble binder layer containing the substantially light-unsensitive silver salt.

Preferred hydrophilic colloids for coating an outermost hydrophilic water-permeable layer are protein-type polymers such as gelatin, cassein, collagen, albumin, or gelatin derivatives, e.g. acetylated gelatin. Further suitable water-soluble binding agents are: polyvinyl alcohol, polyvinyl pyrrolidone, dextran, gum arabic, zein, agar-agar, arrowroot and pectin.

According to a particular embodiment said outermost hydrophilic layer may contain finely divided (colloidal) optically transparent inert pigments having a hydrophilic character, such as transparent colloidal silica not masking the underneath formed silver pattern.

The coating of said optional outermost layer and of the imaging layer containing the organic silver salt may proceed by any coating technique known in the art e.g. as described in said Research Disclosure and in "Modern Coating and Drying Technology", edited by Edward D. Cohen and Edgar B. Gutoff, (1992) VCH Publishers Inc. 220 East 23rd Street, Suite 909 New York, N.Y. 10010, U.S.A.

The imaging layer is coated preferably on a support being a thin sheet or weblike carrier material that should be stable preferably at heating temperatures of between 60° and 160° C. For example, the support is made from paper, polyethylene coated paper or transparent resin film, e.g. made of a cellulose ester, e.g. cellulose triacetate, polypropylene, polycarbonate or polyester, e.g. polyethylene terephthalate. The support may be subbed if need be to improve the adherence thereof of the layer containing said silver salt.

When using a sufficiently strong reducing agent there is no need for a uniform heat-treatment to obtain sufficient optical image, but it is in favour of enhanced optical density and to shorten drying time of the deposited "ink" to heat the ink-receiving material in the temperature range of 60° to 160° C. The time and temperature required for substantially enhancing the optical density in the "inked" areas depends largely on the type of the imaging reactants their concentration in the ink and coverage in the ink-receiving material. Using the above defined redox-system of light-unsensitive silver salt and organic reducing agent(s) generally a heating time in the range of 3 to 60 seconds is sufficient to obtain a substantial increase of optical density.

Heat may be supplied by means of a hot body, e.g. hot metal roller, contacting the ink-receiving material or may be supplied in the form of hot air, e.g. in a ventilated drying oven, and/or may be supplied in the form of radiant heat.

Radiant heating may proceed with flash lamp, e.g. xenon gas discharge lamp, incandescent infra-red light lamp or by means of laser beam.

The imaging method according to the present invention can be used for both the production of transparencies and reflection type prints. Such means that the support will be transparent or opaque, e.g. having a white light reflecting aspect. For example, a paper base is present which may contain white light reflecting pigments, optionally also applied in an interlayer between the recording layer and said base. In case a transparent base is used, said base may be colorless or colored, e.g. has a blue colour, of normal use in medical silver halide emulsion film.

In the hard copy field imaging materials have normally a white opaque base, whereas in the medical diagnostic field black-imaged transparencies find wide application in inspection techniques operating with a light box.

The following examples illustrate the present invention. The percentages and ratios are by weight unless otherwise indicated.

EXAMPLE 1

Preparation of Ink Receiving Material

A subbed polyethylene terephthalate support having a thickness of 100 μm was doctor blade-coated from an aqueous coating composition so as to obtain thereon after drying an ink receiving layer containing the following ingredients:

| | |
|---|---|
| silver behenate | 6 $g/m^2$ |
| gelatin | 3.0 $g/m^2$ |
| succinimide (toning agent) | 0.67 $g/m^2$ |
| AEROSOL OT (tradename) (wetting agent) | 0.60 $g/m^2$ |
| ULTRAVON W (tradename) (wetting agent) | 0.06 $g/m^2$ |

Preparation of the Ink for Ink Jet Printing

To a commercial water-base black ink for PAINTJET (tradename) printer of Hewlett Packard (catalogue Nr. 51606A) are added per 3 g 0.3 g of ethanol and 75 mg of therein dissolved catechol.

The black color of the ink is due to a mixture of sulfonated yellow, magenta and cyan dyes, tetramethylammonium cations are present in conjunction with the anionic sulfonic acid groups. The ink contains about 89% of water and 1,5-pentane diol as organic solvent together with polyethylene oxide type wetting agent and carboxymethyl cellulose as thickener.

Ink Jet Printing

The above defined ink has been put in ink-cassette of the MANNESMANN TALLY-printer (tradename) type MT92 (drop-on-demand type ink jet printer).

Modulated by an electronically stored test-pattern "ink jet" printing was carried out onto the above prepared ink image receiving material.

A first part (part A) of the printed surface was post-heated during 30 seconds by pressing the printed area against an aluminum block internally electrically heated at a temperature of 118° C.

A second part (part B) of the printed surface was left at room temperature (20° C.) and the maximum optical densities in both of said parts were measured through ortho filter with MacBeth TD 904 densitometer.

The measured minimum densities (Dmin) and maximum densities (Dmax) are listed in the following Table 1.

TABLE 1

| Part | Dmin | Dmax |
|---|---|---|
| A | 0.12 | 3.2 |
| B | 0.12 | 1.0 |

EXAMPLE 2

The imaging layer was coated on a support as described in Example 1 from methyl ethyl ketone as coating vehicle and contained after coating and drying the following ingredients:

| | |
|---|---|
| silver behenate | 6.5 $g/m^2$ |
| polyvinyl butyral [BUTVAR B79 - tradename) | 6.5 $g/m^2$ |
| 3,4-dihydro-2,4-dioxo-1,3,2H-benzoxazine | 0.74 $g/m^2$ |
| BAYSILONE Öl A (tradename) | 25 $mg/m^2$ |

The imaging layer was coated at the imaging side with an outermost hydrophilic water-absorbing layer containing 5 $g/m^2$ of gelatin.

Ink jet printing proceeded with the same black colored ink as described in Example 1 (part A) and with the black colored ink of example 1 without the addition of a reducing agent (part B).

As in Example 1 the ink receiving material was heated at 118° C.

The receiving material in its non-inked state had an optical density of 0.09, which density did not change by heating at 118° C.

The measured minimum densities (Dmin) and maximum densities (Dmax) of the "inked" receiving material parts A (ink with reducing agent) and the "inked" receiving material parts B (ink without reducing agent) are listed in the following Table 2.

TABLE 2

| Part | Dmin | Dmax |
|---|---|---|
| A | 0.09 | 2.6 |
| B | 0.09 | 0.9 |

EXAMPLE 3

Example 2 was repeated but with the difference that the outermost layer of the ink receiving material contained 5 $g/m^2$ of polyvinyl alcohol.

The measured minimum densities (Dmin) and maximum densities (Dmax) of the "inked" receiving material parts A and B are listed in the following Table 3.

TABLE 3

| Part | Dmin | Dmax |
|---|---|---|
| A | 0.09 | 2.3 |
| B | 0.09 | 0.8 |

EXAMPLE 4

Example 2 was repeated but with the difference that the outermost layer of the ink receiving material contained 5 $g/m^2$ of polyacrylic acid.

The measured minimum densities (Dmin) and maximum densities (Dmax) of the "inked" receiving material parts A and B are listed in the following Table 4.

TABLE 4

| Part | Dmin | Dmax |
|---|---|---|
| A | 0.10 | 3.6 |
| B | 0.10 | 1.0 |

EXAMPLE 5

Example 2 was repeated but with the difference that the outermost layer of the ink receiving material contained 5 $g/m^2$ of polyurethane latex IMPRANIL 43056 (tradename of BAYER AG—Germany)

The measured minimum densities (Dmin) and maximum densities (Dmax) of the "inked" receiving material parts A and B are listed in the following Table 5.

TABLE 5

| Part | Dmin | Dmax |
|---|---|---|
| A | 0.09 | 2.5 |
| B | 0.10 | 1.0 |

EXAMPLE 6

Example 2 was repeated with the difference however, that the above prepared ink receiving material was coated at the imaging side with an outermost hydrophilic water-absorbing layer being a coating containing 5 $g/m^2$ of unhardened gelatin, and a colorless is ink was used in ink jet printing.

The applied "colorless" ink had the following composition:

| | |
|---|---|
| carboxymethylcellulose | 0.5 g |
| 1,5-pentane diol | 0.7 ml |
| catechol | 1.00 g |
| wetting agent | 4.0 ml |
| ULTRAVON W (tradename) (wetting agent) | 0.06 g |

Before putting the ink in the ink jet cassette it had been filtered through a MILLIPOE (tradename) Type GS filter having pores with average diameter of 0.22 μm.

As in Example 1 one part of the ink receiving material was heated at 118° C. and another part left at room temperature (20° C).

The receiving material in its non-inked state had an optical density of 0.09, which density did not change by heating at 118° C.

The measured minimum densities (Dmin) and maximum densities (Dmax) of the "inked" receiving material parts A and B are listed in the following Table 6.

TABLE 6

| Part | Dmin | Dmax |
|---|---|---|
| A | 0.14 | 3.4 |
| B | 0.09 | 0.09 |

EXAMPLE 7

Preparation of Ink Receiving Material (1)

A subbed polyethylene terephthalate support having a thickness of 100 μm was doctor blade-coated from a methyl ethylketone coating solution so as to obtain thereon after drying an ink receiving layer containing the following ingredients:

| | |
|---|---|
| silver behenate | 4.8 $g/m^2$ |
| polyvinyl butyral [BUTVAR B79 - tradename) | 4.8 $g/m^2$ |
| 3,4-dihydro-2,4-dioxo-1,3,2H-benzoxazine | 0.35 $g/m^2$ |
| BAYSILONE Öl A (tradename) | 18 $mg/m^2$ |

Preparation of Ink Receiving Material (2)

Ink receiving material (2) was prepared as ink receiving material (1) but with the difference that the coating solution further contained p-(phenylsulphonamido)phenol in an amount such that it was contained in the dried coating in an amount of 2.68 $g/m^2$.

One part (part A) of each receiving material was printed with a commercial ink by means of a continuous stream ink jet apparatus. A second part (part B) of each receiving material was printed with the same commercial ink to which 10% by weight of ethyl gallate was added as reducing agent. The receiving materials were heated subsequently as described in example 2. The maximum and minimum densities obtained in each case are shown in the following Table 7.

TABLE 7

| Receiving | Part A | | Part B | |
|---|---|---|---|---|
| material | $D_{min}$ | $D_{max}$ | $D_{min}$ | $D_{max}$ |
| 1 | 0.06 | 0.9 | 0.05 | 4.1 |
| 2 | 0.06 | 1.0 | 0.06 | 4.3 |

We claim:

1. A recording method comprising the steps of:

1) providing a receiving material containing at least one substantially light-insensitive organic silver salt, and 2) image-wise applying liquid in the form of droplets onto said receiving material to form a visually detectable image, said liquid containing a reducing agent for said silver salt.

2. Recording method according to claim 1 wherein said receiving material contains the substantially light-sensitive silver salt in a layer of a film-forming binder that is permeable either for said liquid or for the reducing agent in dissolved, molten state or vaporized state.

3. Recording method according to claim 2 wherein said silver salt is present in said binder in a silver salt/binder ratio by weight from 0.2 to 6 and wherein the said layer has a thickness between 5 and 16 μm.

4. A recording method comprising the steps of:

1) providing a receiving material, and 2) image-wise applying liquid in the form of droplets onto said receiving material to form a visually detectable image, the said liquid containing at least one substantially light-insensitive organic silver salt and the said receiving material containing a reducing agent for said silver salt.

5. A recording method according to claim 1 or according to claim 4 comprising the further step of heating said receiving material during and/or after applying said liquid onto said receiving material to start or enhance reduction of said silver salt(s) forming thereby image-wise a deposit of silver metal in said receiving material.

6. Recording method according to claim 5 wherein said image receiving layer after image-wise applying said liquid thereon is heated to a temperature of between 60° and 160° C.

7. Recording method according to claim 1 or according to claim 4 wherein said liquid is colored before being applied onto said receiving material.

8. Recording method according to claim 1 or according to claim 4 wherein said substantially light-insensitive organic silver salts are silver salts of aliphatic carboxylic acids having an aliphatic carbon chain of at least 12 C-atoms.

9. Recording method according to claim 1 or according to claim 4 wherein said reducing agent is an organic compound containing a benzene nucleus having two free hydroxy groups (—OH) in ortho-position.

10. Recording method according to claim 1 or according to claim 4, wherein said receiving material contains an auxiliary reducing agent being a sterically hindered phenol.

11. Recording method according to claim 1 or according to claim 4 wherein said receiving material contains a toning agent in order to obtain a neutral black image tone in areas of high optical density and neutral grey tone in areas of low optical density.

* * * * *